United States Patent
Lin et al.

(10) Patent No.: US 9,923,387 B2
(45) Date of Patent: Mar. 20, 2018

(54) MULTI-MODE WIRELESS RECEIVER APPARATUS AND RESONATOR CIRCUIT DESIGN

(71) Applicant: MEDIATEK INC., Hsin-Chu (TW)

(72) Inventors: Hung-Chih Lin, Yunlin County (TW); Yen-Hsun Hsu, Hsinchu County (TW); Hao-Ping Hong, Hsinchu County (TW)

(73) Assignee: MediaTek Inc., Hsin-Chu (TW)

( * ) Notice: Subject to any disclaimer, the term of this patent is extended or adjusted under 35 U.S.C. 154(b) by 392 days.

(21) Appl. No.: 14/821,816

(22) Filed: Aug. 10, 2015

(65) Prior Publication Data
US 2016/0204619 A1    Jul. 14, 2016

Related U.S. Application Data

(60) Provisional application No. 62/101,388, filed on Jan. 9, 2015.

(51) Int. Cl.
*H02J 5/00* (2016.01)
*H01F 38/14* (2006.01)

(52) U.S. Cl.
CPC ............. *H02J 5/005* (2013.01); *H01F 38/14* (2013.01); *H01F 2038/146* (2013.01)

(58) Field of Classification Search
None
See application file for complete search history.

(56) References Cited

U.S. PATENT DOCUMENTS

| | | | |
|---|---|---|---|
| 2013/0134793 A1 | 5/2013 | Ryu et al. | |
| 2014/0035383 A1* | 2/2014 | Riehl | H01F 38/14 307/104 |
| 2014/0159656 A1 | 6/2014 | Riehl | |

FOREIGN PATENT DOCUMENTS

| | | |
|---|---|---|
| WO | WO 2014061351 A1 | 4/2014 |
| WO | WO 2014092339 A1 | 6/2014 |

OTHER PUBLICATIONS

European Search Report dated May 19, 2016 from corresponding European Application No. 15180929.0.

* cited by examiner

*Primary Examiner* — Jared Fureman
*Assistant Examiner* — James Evans
(74) *Attorney, Agent, or Firm* — Wolf, Greenfield & Sacks, P.C.

(57) ABSTRACT

A resonator circuit includes: a first inductive element and a second inductive element that is connected to the first inductive element in series; a first capacitive element, connected to a first end of the first inductive element and a first output end of the resonator circuit; and a set of second capacitive elements connected in series, the set of second capacitive elements having one end connected between the first and second inductive elements and having another end connected between the second inductive element and a second output end of the resonator circuit. The intermediate end of the set of second capacitive elements is used as a third output end of the resonator circuit.

12 Claims, 4 Drawing Sheets

US 9,923,387 B2

MULTI-MODE WIRELESS RECEIVER APPARATUS AND RESONATOR CIRCUIT DESIGN

CROSS REFERENCE TO RELATED APPLICATIONS

This application claims the benefit of U.S. provisional application No. 62/101,388 filed Jan. 9, 2015, and included herein by reference.

BACKGROUND

The present invention relates to a wireless power receiver scheme, and more particularly to a multi-mode wireless receiver apparatus and corresponding resonator circuit design.

Generally speaking, for the field of wireless power transfer, a traditional power receiver scheme needs a corresponding number of coils and rectifiers to implement multi-mode wireless power transfer function. For example, the traditional power receiver scheme may need N coils and N rectifiers to implement N mode wireless power transfer function. A conventional wireless power receiver is provided to solve this problem. FIG. 4 is a diagram showing a conventional wireless power receiver 400. The conventional wireless power receiver 400 includes one set of coils (inductors L2, L3, capacitors C2a, C2q, C2b) and one rectifier 405. To implement dual-mode wireless power transfer function, the inductors L2, L3 and capacitor C2q form a resonant loop to generate a frequency response signal while the inductor L3 and capacitor C2a form another resonant loop to generate another frequency response signal. Accordingly, the conventional wireless power receiver 400 can reduce two coils and two rectifiers to one set of coil and rectifier. However, this conventional wireless power receiver inevitably suffers an over voltage rising problem at a light loading condition due to resonant frequency drifts. An over voltage protection may be erroneously triggered at the light loading condition. It is not desirable for the conventional wireless power receiver.

SUMMARY

Therefore one of the objectives of the present invention is to provide a multi-mode wireless receiver apparatus and corresponding resonator circuit to simultaneously solve the above-mentioned problems.

According to an embodiment of the present invention, a wireless receiver apparatus is disclosed. The wireless receiver apparatus comprises a resonator circuit and a rectifier circuit. The resonator circuit includes: a first inductive element and a second inductive element that is connected to the first inductive element in series; a first capacitive element, connected to a first end of the first inductive element and a first output end of the resonator circuit; and a set of second capacitive elements connected in series, the set of second capacitive elements having one end connected between the first and second inductive elements and having another end connected between the second inductive element and a second output end of the resonator circuit. The rectifier circuit is configured to provide rectification for a signal from the resonator circuit. An intermediate end of the set of second capacitive elements is connected to the rectifier circuit.

According to an embodiment of the present invention, a resonator circuit is disclosed. The resonator circuit comprises: a first inductive element and a second inductive element that is connected to the first inductive element in series; a first capacitive element, connected to a first end of the first inductive element and a first output end of the resonator circuit; and a set of second capacitive elements connected in series, the set of second capacitive elements having one end connected between the first and second inductive elements and having another end connected between the second inductive element and a second output end of the resonator circuit. An intermediate end of the set of second capacitive elements is used as a third output end of the resonator circuit.

According to embodiments of the present invention, almost no frequency drifts are introduced into the wireless receiver apparatuses 100 and 200 when the apparatuses 100 and 200 operate at a light loading condition. Thus, the apparatuses 100 and 200 at the light loading condition do not receive too much power from a wireless power transmitter. Thus, the over-voltage protection is not erroneously triggered at the light loading condition. In addition, in the embodiments, only one set of receiver winding coil is needed to implement the function of multi-mode wireless power reception. Additional circuit costs can be saved.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
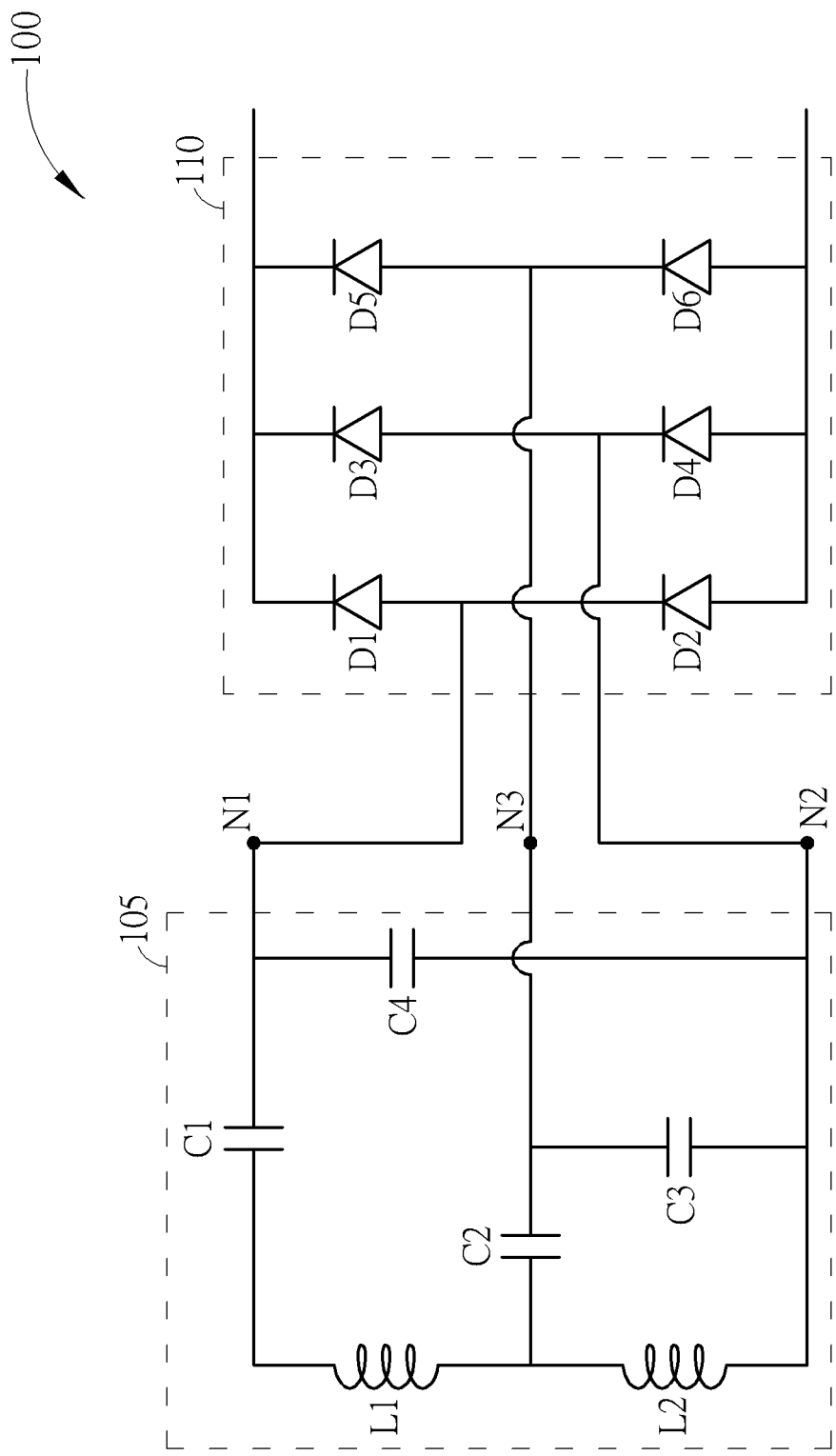
FIG. 1 is a circuit diagram of a wireless receiver apparatus according to an embodiment of the invention.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Additionally, the terms such as "first" and "second" in this context are only used to distinguish different components and do not constrain the order of generation.

Please refer to FIG. 1, which is a circuit diagram of a wireless receiver apparatus 100 according to an embodiment of the present invention. In this embodiment, the wireless receiver apparatus 100 is a multi-mode wireless power receiver and can be used for supporting resonance of multiple frequency signals defined in different frequency bands from a wireless power transmitter (not shown in FIG. 1) to provide or output adaptive direct-current (DC) voltage levels for charging a battery (not shown in FIG. 1). That is, the wireless receiver apparatus 100 can receive wireless power from the transmitter at multiple frequencies. Additionally, the wireless receiver apparatus 100 can be implemented by using only one set of receiver coil (i.e. only one secondary winding coil) to achieve the function of supporting resonance of multiple frequency signals. In addition, it is not necessary to use too many rectifier diodes/switches to implement the design of wireless receiver apparatus 100; circuit costs can be saved.

The wireless receiver apparatus 100 can be used for receiving power with at least two different frequency signals defined in different frequency bands so as to provide different DC voltage levels for the following stage of circuits at different loading conditions. The following table shows different power standards and corresponding transmission power frequencies:

| Standard | TX Frequency | Note |
| --- | --- | --- |
| QI | 100 KHz-200 KHz | Varied |
| PMA | 200 KHz-300 KHZ | Varied |
| A4WP | 6.78 MHz | Fixed |
| NFC | 13.56 MHz | Fixed |

For example, based on the specification of Qi standard, the wireless receiver apparatus 100 can receive power at two different frequencies of 100 KHz-200 KHz at different loading conditions In addition, based on the specification of PMA (Power Matters Alliance) standard, the above-mentioned wireless power transmitter may transmit power at a frequency of 200 KHz-300 KHz, and the wireless receiver apparatus 100 at a heavy loading condition can receive higher power with a resonance frequency of 200 KHz-300 KHz and at a light loading condition can receive lower power with a different resonant frequency of 200 KHz-300 KHz. In addition, the wireless receiver apparatus 100 can receive power with a higher frequency around 6.78 MHz which is specified by a different wireless power charging standard, i.e. A4WP (Alliance for Wireless Power) standard. In addition, the wireless receiver apparatus 100 can receive power with a fixed frequency around 13.56 MHz which is specified by a different wireless power charging standard, i.e. NFC standard. Thus, the wireless receiver apparatus 100 supports a multi-mode wireless power receiving function and multiple wireless power charging standards. The wireless receiver apparatus 100 can correspondingly provide/generate an adaptive DC voltage level based on the loading condition and the frequency from the wireless power transmitter. In addition, it should be noted that the design of multi-mode wireless receiver is merely used for illustrative purposes and is not intended to be a limitation of the invention. The wireless receiver apparatus 100 may be a dual mode wireless receiver in a different embodiment.

Specifically, the wireless receiver apparatus 100 comprises a resonator circuit 105 and a rectifier circuit 110. The resonator circuit 105 is used for exhibiting resonant behavior at different resonant frequency ranges (i.e. different frequency bands) based on the loading condition and the different signals/frequencies from the above-mentioned wireless power transmitter to generate/output different response signals respectively. The rectifier circuit 110 is arranged to perform rectification upon response signal(s) (AC voltage waveforms) from the resonator circuit 105 to generate an adaptive DC voltage level for charging.

In practice, the resonator circuit 105 comprises multiple inductive elements such as inductors L1 and L2 and multiple capacitive elements such as capacitors C1, C2, C3, and C4. The inductors L1 and L2 are connected in series and can be implemented by one receiver coil. The capacitor C1 is connected to a first end of the inductor L1 and a first output end N1 of the resonator circuit 105. The set of capacitors C2 and C3 are connected in series and have one end connected between the inductors L1 and L2 and another end connected between inductor L2 and the second output end N2 of resonator circuit 105. The capacitors C1-C4 may be regarded as a matching network for the inductors L1, L2.

When the wireless receiver apparatus 100 is at the heavy loading condition and the above-mentioned wireless power transmitter transmits power based on the Qi standard, the resonator circuit 105 is used for generating/providing a first response signal defined in a first frequency band; in this embodiment, the first frequency band is around 100 Khz, and the first response signal indicates a low frequency response signal. The capacitance value of capacitor C1 is designed to be much greater than those of capacitors C2 and C3 so that the capacitors C2 and C3 can be approximated as open circuits when the resonator circuit 105 operates at a low resonance frequency. Accordingly, in this situation, the inductors L1, L2, and capacitor C1 form a first resonant loop to generate the low frequency response signal to the rectifier circuit 110.

When the wireless receiver apparatus 100 is at the heavy loading condition and the above-mentioned wireless power transmitter transmits power based on other wireless power charging standard such as Alliance for Wireless Power (A4WP) standard, the resonator circuit 105 is used for generating/providing a second response signal defined in a second frequency band; in this embodiment, the second frequency band is around 6.78 Mhz, and the second response signal indicates a higher frequency response signal. The capacitance value of capacitor C1 is much greater than those of capacitors C2 and C3, and the capacitor C1 can be approximated as a short circuit when the resonator circuit 105 operates at a high resonance frequency. Accordingly, in this situation, the inductor L2 and capacitors C2, C3 form a second resonant loop to generate the high frequency response signal to the rectifier circuit 110. The second frequency response signal (i.e. high frequency response signal) is transmitted to the rectifier circuit 110 via an intermediate end of the set of capacitors C2, C3, and an end of capacitor C3. The arrangement of inductors L1, L2 can be regarded as a center-taped arrangement since the inductors L1, L2 can be implemented by the same set of winding coil and the high frequency response signal is transmitted to the rectifier circuit 110 from the intermediate point between the inductors L1, L2 via the capacitor C2.

When the wireless receiver apparatus 100 is at the light loading condition and the above-mentioned wireless power transmitter transmits power based on the Qi standard, the resonator circuit 105 is used for generating/providing a third response signal defined in a third frequency band; in this embodiment, the third frequency band is around 1 MHz.

The rectifier circuit 110 includes three input terminals N1-N3 and two output terminals, and comprises three sets of diodes each set comprising two diodes connected in series. The three sets of diodes including a first set of diodes D1, D2, a second set of diodes D3, D4, and a third set of diodes D5, D6. The arrangement of first and second sets of diodes D1-D4 can be regarded as an arrangement of a bridge rectifier. The first output end N1 of the resonator circuit 105 is connected between the first set of diodes D1, D2, the second output end N2 of the resonator circuit 105 is connected to the second set of diodes D3, D4, and an intermediate end of the set of capacitors C2, C3 is connected to the third set of diodes D5, D6.

Figure 2:
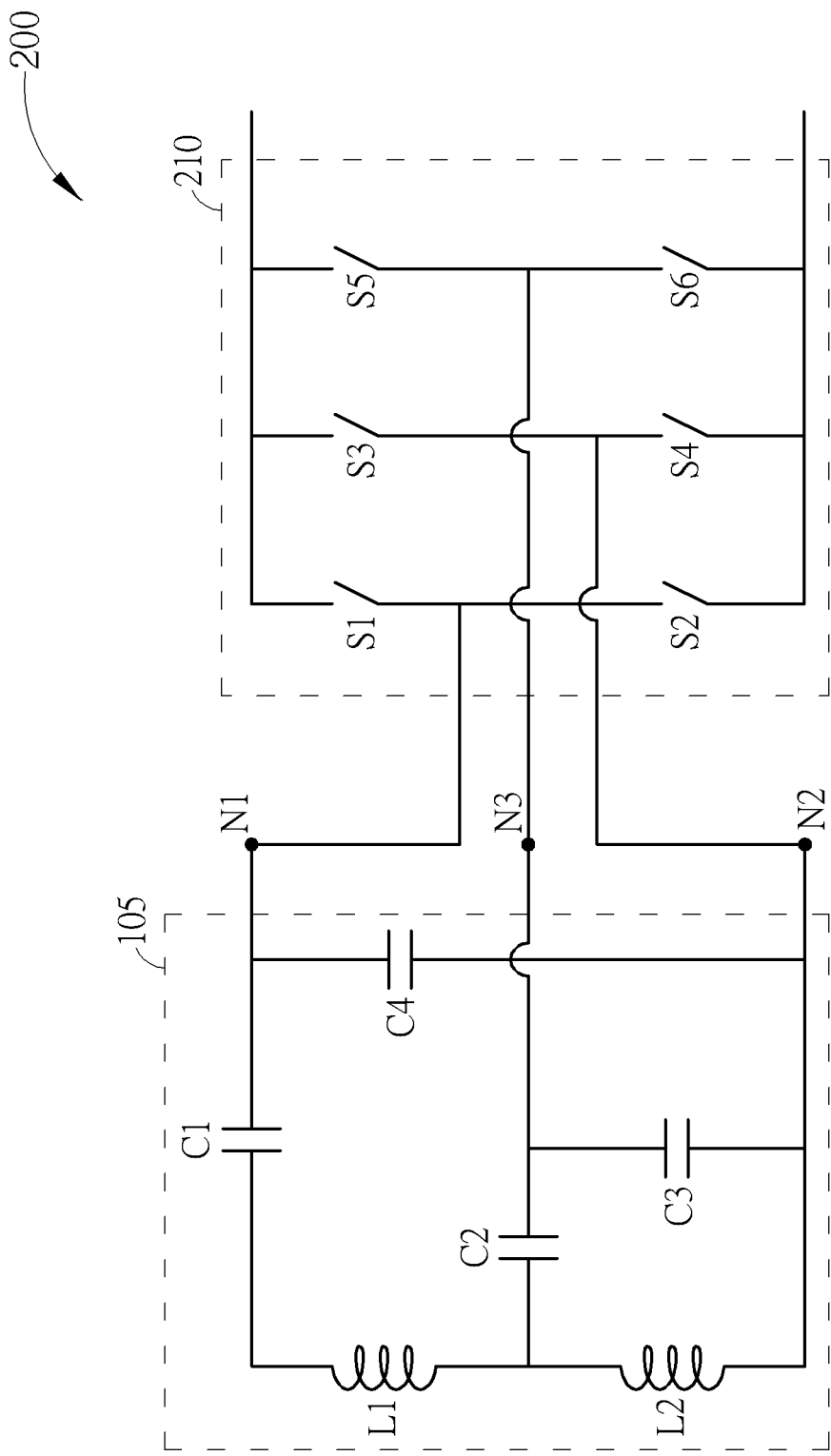
FIG. 2 is a circuit diagram of a wireless receiver apparatus according to another embodiment of the invention.

Additionally, the design of a rectifier circuit in the embodiment is not meant to be a limitation of the present invention. The rectifier circuit may be implemented by using transistor switches in another embodiment. Please refer to FIG. 2, which is a circuit diagram of a wireless receiver apparatus 200 according to another embodiment of the invention. The wireless receiver apparatus 200 comprises the resonator circuit 105 as described in FIG. 1 and a rectifier circuit 210. The operation and function of resonator circuit 105 as shown FIG. 2 are identical to the operation and function of resonator circuit 105 as shown FIG. 1; further description is not detailed. The rectifier circuit 210 is coupled to the resonator circuit 105 and configured to provide rectification for the response signal from the resonator circuit 105. The rectifier circuit 210 comprises three sets of switches each set comprising two switches connected in series. The three sets of switches including a first set of switches S1, S2, a second set of switches S3, S4, and a third set of switches S5, S6. The first output end N1 of the resonator circuit 105 is connected between the first set of switches S1, S2, the second output end N2 of the resonator circuit 105 is connected to the second set of switches S3, S4, and an intermediate end of the set of capacitors C2, C3 is connected to the third set of switches S5, S6. The third set of diodes D5 and D6 shown in FIG. 1 and the third set of switches S5, S6 shown in FIG. 2 are auxiliary designs and can be regarded as auxiliary diode pairs and auxiliary switch pairs, respectively.

Figure 3:
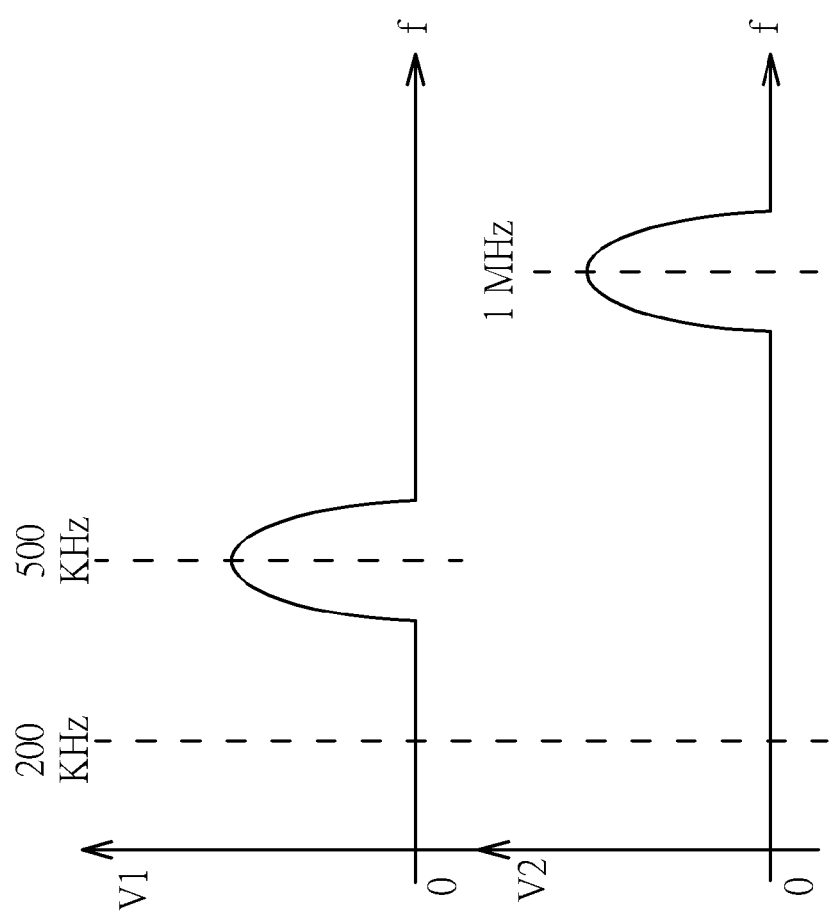
FIG. 3 is a comparative diagram of a coupling AC voltage waveform of the response signal from the resonator circuit shown in FIG. 1 or FIG. 2 vs. a diagram of coupling AC voltage waveform of a response signal from a resonator of a conventional power receiver.
Figure 4:
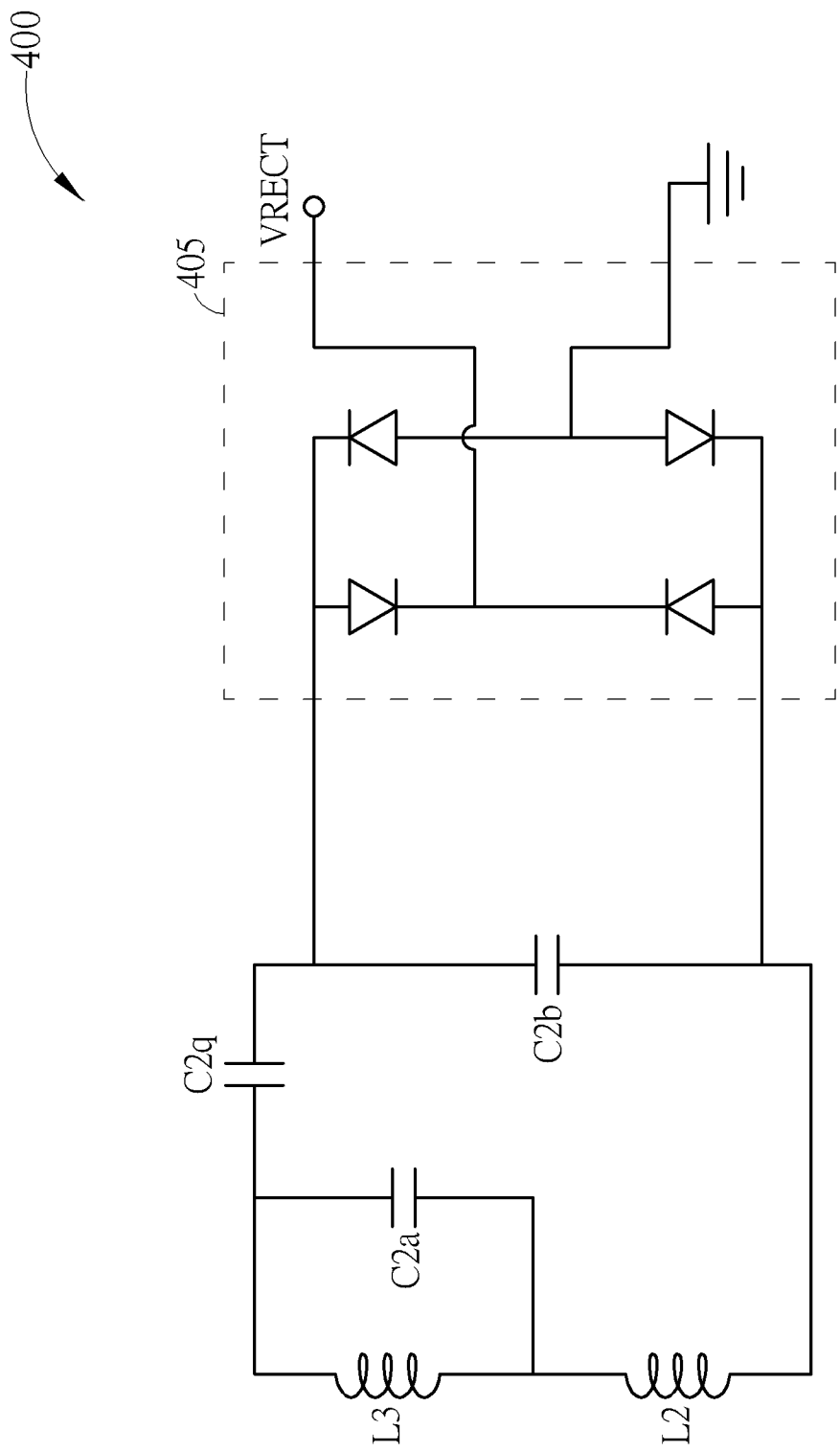
FIG. 4 is a diagram showing a conventional wireless power receiver.

Please refer to FIG. 3, which is a comparative diagram of a coupling AC voltage waveform of the response signal from the resonator circuit 105 shown in FIG. 1 or FIG. 2 vs. a diagram of coupling AC voltage waveform of a response signal from a resonator of a conventional power receiver. When the conventional power receiver operates at the light loading condition and the wireless power transmitter transmits power based on Qi standard, ideally a resonator within a conventional wireless receiver operates at the frequency of 1 Mhz which is far away from the range of 110 Khz~205 Khz defined by Qi standard, and ideally the conventional wireless power receiver operating at the light loading condition does not receive too much power from the wireless power transmitter. However, practically, as shown in FIG. 3, V1 indicates the coupling AC voltage waveform caused by a frequency resonance from the resonator in the conventional wireless power receiver. V1 shows that the conventional wireless power receiver at the light loading condition practically operates at the resonance frequency around 500 KHz instead of 1 MHz. That is, the frequency response is drifted significantly. Since the frequency 500 Khz is closed to the range of 110 Khz~205 Khz defined by Qi standard, this inevitably causes the conventional wireless power receiver operating at the light loading condition receive much higher power from the wireless power transmitter. Due to this, the conventional wireless power receiver at the light loading condition often triggers an over-voltage protection which is not necessary for the light loading condition.

In order to solve the above-described problem, the wireless receiver apparatus 100 and 200 are provided. As shown in FIG. 3, V2 indicates a coupling voltage response waveform caused by frequency resonance from the resonator circuit 105 of the embodiments in FIG. 1 or FIG. 2. V2 shows that the wireless receiver apparatuses 100 and 200 at the light loading condition practically operate at the resonance frequency around 1 MHz based on Qi standard. Almost no frequency drifts are introduced. Accordingly, this can prevent the apparatuses 100 and 200 from receiving much higher power from the wireless power transmitter when the apparatuses 100 and 200 operate at the light loading condition. Thus, the problem of triggering an undesired over-voltage protection can be solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless receiver apparatus, comprising:
   a resonator circuit, including:
   a first inductive element and a second inductive element that is connected to the first inductive element in series;
   a first capacitive element, connected to a first end of the first inductive element and a first output end of the resonator circuit; and
   a set of second capacitive elements connected in series, the set comprising a pair of capacitive elements with no intervening elements, the set of second capacitive elements having one end connected between the first and second inductive elements and having another end connected between the second inductive element and a second output end of the resonator circuit; and
   a rectifier circuit, configured to provide rectification for a signal from the resonator circuit;
   wherein an intermediate end of the set of second capacitive elements is connected to the rectifier circuit.

2. The wireless receiver apparatus of claim 1, wherein the first and second inductive elements and the first capacitive element form a resonant loop for providing a first response signal defined in a first frequency band; and, the second inductive element and the set of second capacitive elements form another resonant loop for providing a second response signal defined in a second frequency band.

3. The wireless receiver apparatus of claim 1, wherein the first frequency band is a low frequency band, and the second frequency band is a high frequency band.

4. The wireless receiver apparatus of claim 1, wherein the second response signal is transmitted to the rectifier circuit via the intermediate end of the set of second capacitive elements and an end of the second inductive element.

5. The wireless receiver apparatus of claim 1, wherein the resonator circuit is arranged to generate the first response signal defined in the first frequency band when the wireless receiver apparatus operates at a heavy loading condition, and the resonator circuit is arranged to generate a third response signal defined in a third frequency band when the wireless receiver apparatus operates at a light loading condition; the third frequency band is far away from the first frequency band.

6. The wireless receiver apparatus of claim 1, wherein the rectifier circuit comprises:
   three sets of diodes each set comprising two diodes connected in series, the three sets of diodes including a first set of diodes, a second set of diodes, and a third set of diodes, that are connected in parallel;
   wherein the first output end of the resonator circuit is connected between the first set of diodes, the second output end of the resonator circuit is connected to the second set of diodes, and an intermediate end of the set of second capacitive elements is connected to the third set of diodes.

7. The wireless receiver apparatus of claim 1, wherein the rectifier circuit comprises:
three sets of switches each set comprising two switches connected in series, the three sets of switches including a first set of switches, a second set of switches, and a third set of switches, that are connected in parallel;
wherein the first output end of the resonator circuit is connected between the first set of switches, the second output end of the resonator circuit is connected to the second set of switches, and an intermediate end of the set of second capacitive elements is connected to the third set of switches.

8. A resonator circuit, comprising:
a first inductive element and a second inductive element that is connected to the first inductive element in series;
a first capacitive element, connected to a first end of the first inductive element and a first output end of the resonator circuit; and
a set of second capacitive elements connected in series, the set comprising a pair of capacitive elements with no intervening elements, the set of second capacitive elements having one end connected between the first and second inductive elements and having another end connected between the second inductive element and a second output end of the resonator circuit;
wherein an intermediate end of the set of second capacitive elements is used as a third output end of the resonator circuit.

9. The resonator circuit of claim 8, wherein the first and second inductive elements and the first capacitive element form a resonant loop for providing a first response signal defined in a first frequency band; and, the second inductive element and the set of second capacitive elements form another resonant loop for providing a second response signal defined in a second frequency band.

10. The resonator circuit of claim 8, wherein the first frequency band is a low frequency band, and the second frequency band is a high frequency band.

11. The resonator circuit of claim 8, wherein the second response signal is transmitted to the rectifier circuit via the intermediate end of the set of second capacitive elements and an end of the second inductive element.

12. The resonator circuit of claim 8, wherein the resonator circuit is arranged to generate the first response signal defined in the first frequency band when the wireless receiver apparatus operates at a heavy loading condition, and the resonator circuit is arranged to generate a third response signal defined in a third frequency band when the wireless receiver apparatus operates at a light loading condition; the third frequency band is far away from the first frequency band.

* * * * *